United States Patent
Bai et al.

(10) Patent No.: US 11,476,911 B2
(45) Date of Patent: Oct. 18, 2022

(54) SYSTEM AND METHOD FOR DETERMINING CHANNEL STATE INFORMATION

(71) Applicant: QUALCOMM Incorporated, San Diego, CA (US)

(72) Inventors: Tianyang Bai, Somerville, NJ (US); Junyi Li, Chester, NJ (US); Juergen Cezanne, Ocean Township, NJ (US); Vasanthan Raghavan, West Windsor Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 17/021,952

(22) Filed: Sep. 15, 2020

(65) Prior Publication Data
US 2021/0091838 A1    Mar. 25, 2021

Related U.S. Application Data

(60) Provisional application No. 62/902,925, filed on Sep. 19, 2019.

(51) Int. Cl.
| | | |
|---|---|---|
| H04B 7/06 | (2006.01) | |
| H04L 5/00 | (2006.01) | |
| H04W 4/02 | (2018.01) | |

(52) U.S. Cl.
CPC ......... *H04B 7/0626* (2013.01); *H04B 7/0632* (2013.01); *H04B 7/0639* (2013.01); *H04L 5/005* (2013.01); *H04W 4/027* (2013.01)

(58) Field of Classification Search
CPC .. H04B 7/0626; H04B 7/0632; H04B 7/0639; H04L 5/005–006; H04W 4/02; H04W 4/024; H04W 4/027
See application file for complete search history.

(56) References Cited

U.S. PATENT DOCUMENTS

2012/0250557 A1* 10/2012 Zirwas ............. H04W 72/1231
370/252

FOREIGN PATENT DOCUMENTS

| CN | 110034792 A | 7/2019 | |
|---|---|---|---|
| WO | WO-2017142574 A1 * | 8/2017 | ........... H04B 7/0639 |
| WO | 2019138156 A1 | 7/2019 | |

(Continued)

OTHER PUBLICATIONS

International Search Report and Written Opinion—PCT/US2020/051120—ISA/EPO—dated Jan. 11, 2021.

*Primary Examiner* — Michael Thier
*Assistant Examiner* — Prince A Mensah
(74) *Attorney, Agent, or Firm* — Arent Fox, LLP

(57) ABSTRACT

In an aspect of the disclosure, a method, a computer-readable medium, and an apparatus are provided. The apparatus may receive at least two reference signals from a base station. The apparatus may determine CSI associated with at least one of the at least two reference signals. The apparatus may determine at least one parameter based on the CSI. The apparatus may transmit, to the base station, the at least one parameter and the CSI to enable a predicted CSI to be determined based on the at least one parameter and the CSI. The apparatus may receive data or control information from the base station based on predictive CSI determined by the base station using the transmitted at least one parameter and CSI.

30 Claims, 10 Drawing Sheets

(56) References Cited

FOREIGN PATENT DOCUMENTS

| WO | WO-2019138156 A1 | * | 7/2019 | ......... H04L 25/0222 |
|----|------------------|---|--------|------------------------|
| WO | 2020163086 | | 8/2020 | |
| WO | 2020213964 A1 | | 10/2020 | |

* cited by examiner

SYSTEM AND METHOD FOR DETERMINING CHANNEL STATE INFORMATION

CROSS-REFERENCE TO RELATED APPLICATION(S)

This application claims the benefit of U.S. Provisional Application Ser. No. 62/902,925, entitled "SYSTEM AND METHOD FOR DETERMINING CHANNEL STATE INFORMATION" and filed on Sep. 19, 2019, which is expressly incorporated by reference herein in its entirety.

BACKGROUND

Technical Field

The present disclosure relates generally to communications systems, and more particularly, to a user equipment configured to provide a parameter to a base station to predict channel state information.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In various wireless communications systems, a base station may schedule communication (e.g., downlink transmissions) with a user equipment (UE) based on the conditions or quality of the channel on which the base station and the UE communicate. For example, the base station may transmit a reference signal to the UE, and the UE may measure one or more values indicative of the channel conditions based on reception of the reference signal. Examples of the one or more values include a reference signal received power (RSRP), a channel coefficient at one or more tones, channel quality indicator (CQI), precoding matrix indicator (PMI), and/or rank indicator (RI). The UE may transmit CSI to the base station that indicates the one or more measured values and, based on the CSI, the base station may schedule communication with the UE.

The foregoing approach to informing the base station of channel conditions may suffer from some issues, such as the delay between the time at which the UE measures the one or more values and the time at which the base station receives the CSI. One technique for avoiding this delay may be for the UE to transmit reference signals to the base station, and the base station may measure one or more values indicative of channel conditions based on reception of the reference signals from the UE. However, this technique may be ineffective for downlink communication when channel reciprocity does not hold between the uplink channel and the downlink channel, as may be the case in frequency-division duplex (FDD) systems.

The issues (e.g., delay) experienced due to CSI reporting by a UE may be exacerbated when the UE is in a high-mobility state (e.g., when the UE is traveling at relatively high rates of speeds), as the high-mobility state may introduce the Doppler effect to communication between the UE and the base station thereby making CSI reporting by the UE time-variant. In other words, the faster the UE is moving, the faster channel conditions change over time. Thus, the coherence time of the channel between the UE and the base station may be due to the high-mobility state of the UE may be less than the delay experienced during CSI reporting by the UE. Consequently, the CSI reported by the UE and used by the base station for scheduling may not accurately reflect the current channel conditions, which may cause a degradation in performance of communication between the base station and the UE (e.g., lower data rates and/or high decoding error rates).

In order to mitigate the issues associated with CSI reporting in high-mobility environments, the UE and/or base station may determine (e.g., estimate, predict, etc.) a predicted CSI based on past observed CSI. Determination of predicted CSI may rely on one or multiple CSI reports from the past. For example, five channel coefficients at 0, 10, 20, 30, 40, 50 ms may be used to determine (e.g., estimate) predicted CSI in the range of 60-100 ms.

Illustratively, the base station may send multiple reference signals to the UE in a relatively brief timespan—e.g., a reference signal at each of 0, 10, 20, 30, and 40 ms. The UE may receive the reference signals and determine CSI for each of the reference signals, which may be reported to the base station in one message or in a short duration. The base station may use the multiple CSI reports to determine (e.g., estimate) predicted CSI. However, using multiple CSI reports may introduce other issues to the determination of channel conditions. For example, the amount of CSI reporting may be relatively high, the UE may be better suited/more able to determine (e.g., forecast or estimate) predicted CSI than the base station, e.g., due to blockages or changes to beamforming configuration at the UE in mmW systems that may affect reception of reference signals by the UE.

Accordingly, the present disclosure may describe techniques and approaches to determination (e.g., estimation, prediction, forecast, etc.) of predicted CSI based on past CSI using at least one parameter reported by the UE. The base station may evaluate a predictive model based on the at least one parameter reported by the UE. The base station may use the result of the evaluation as indicative of predicted CSI to schedule data and/or control information to be transmitted to the UE, thereby avoiding some of the issues commensurate with high-mobility environments.

In an aspect of the disclosure, a method, a computer-readable medium, and an apparatus are provided. The apparatus may be a UE. The apparatus may receive at least two reference signals from a base station. The apparatus may determine CSI associated with at least one of the at least two reference signals. The apparatus may determine at least one parameter based on the CSI. The apparatus may transmit, to the base station, the at least one parameter and the CSI to enable a predicted CSI to be determined based on the at least one parameter and the CSI. The apparatus may receive data or control information scheduled by the base station based on the at least one parameter and based on the CSI.

In another aspect of the disclosure, a method, a computer-readable medium, and an apparatus are provided. The apparatus may be a base station. The apparatus may transmit at least two reference signals to a UE. The apparatus may receive, from the UE, CSI associated with at least one of the at least two reference signals. The apparatus may receive, from the UE, at least one parameter associated with the CSI. The apparatus may evaluate a predictive model based on the CSI and based on the at least one parameter, wherein the evaluation of the predictive model indicates predicted CSI. The apparatus may transmit, to the UE, data or control information that is scheduled based on the predicted CSI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
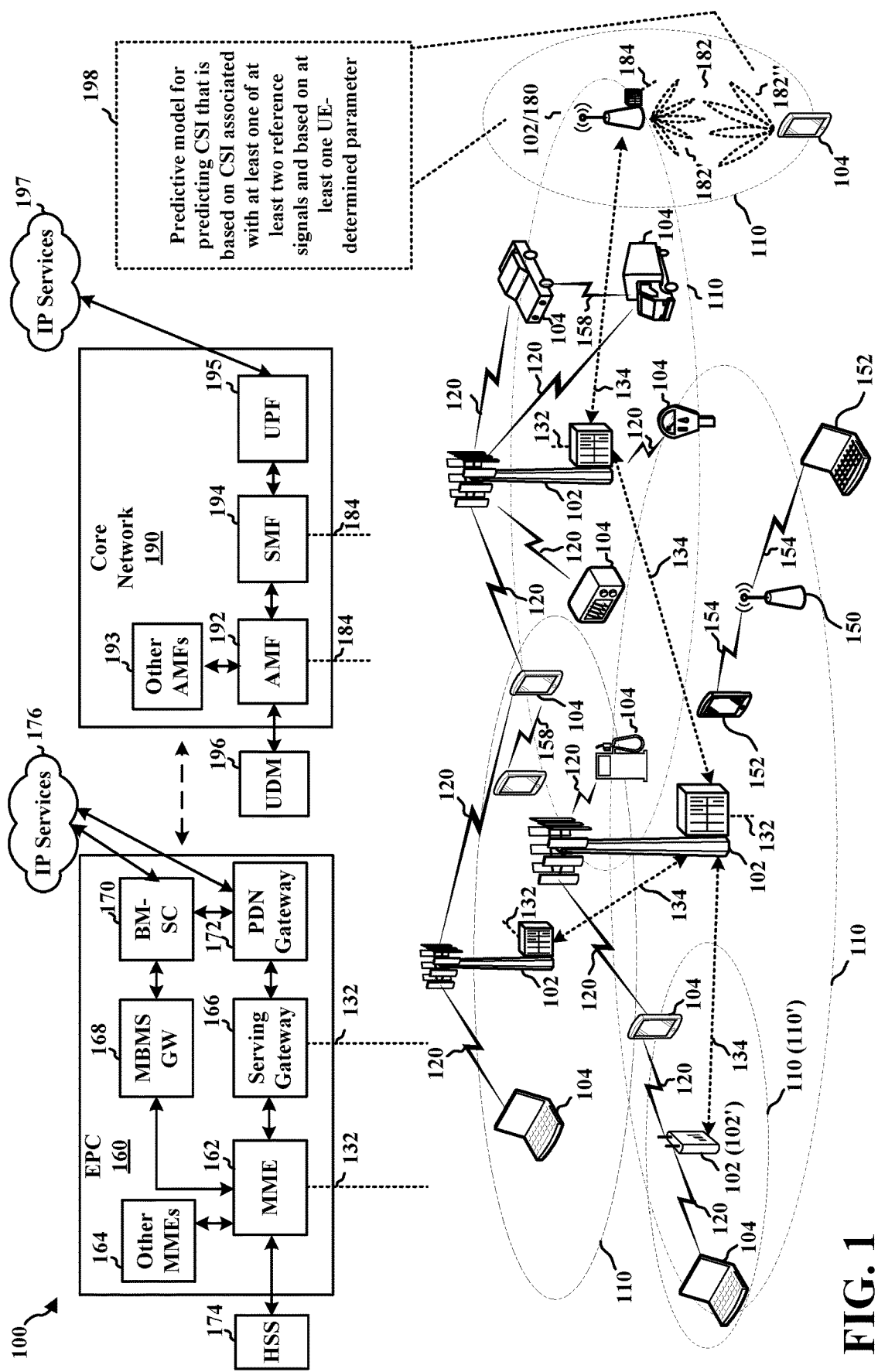
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Referring again to FIG. 1, in certain aspects, the UE 104 and the base station 102/180 may be configured to use a predictive model 198 to determine (e.g., estimate, predict, etc.) future channel state information (CSI), as described in the present disclosure. The predictive model 198 may be based on CSI determined by the UE 104 based on at least two reference signals and, further, may be based on at least one parameter that is determined by the UE 104.

Illustratively, the base station 102/180 may be configured to transmit the at least two reference signals to the UE 104. The base station 102/180 may receive, from the UE 104, CSI associated with at least one of the at least two reference signals. The base station 102/180 may also receive, from the UE 104, at least one parameter associated with the CSI. The base station 102/180 may then evaluate the predictive model 198 based on the CSI and based on the at least one parameter, and the evaluation of the predictive model 198 may indicate predicted CSI associated with communication with the UE 104. Accordingly, the base station 102/180 may transmit, to the UE 104, data or control information that is scheduled based on the predicted CSI.

Correspondingly, the UE 104 may receive the at least two reference signals from the base station 102/180. The UE 104 may then determine CSI associated with at least one of the at least two reference signals. The UE 104 may also determine at least one parameter based on the CSI. The UE 104 may transmit, to the base station 102/180, the at least one parameter and the CSI to enable a predicted CSI to be determined based on the at least one parameter and the CSI. The UE 104 may receive data or control information scheduled by the base station 102/180 based on the at least one parameter and based on the CSI.

Figure 2:
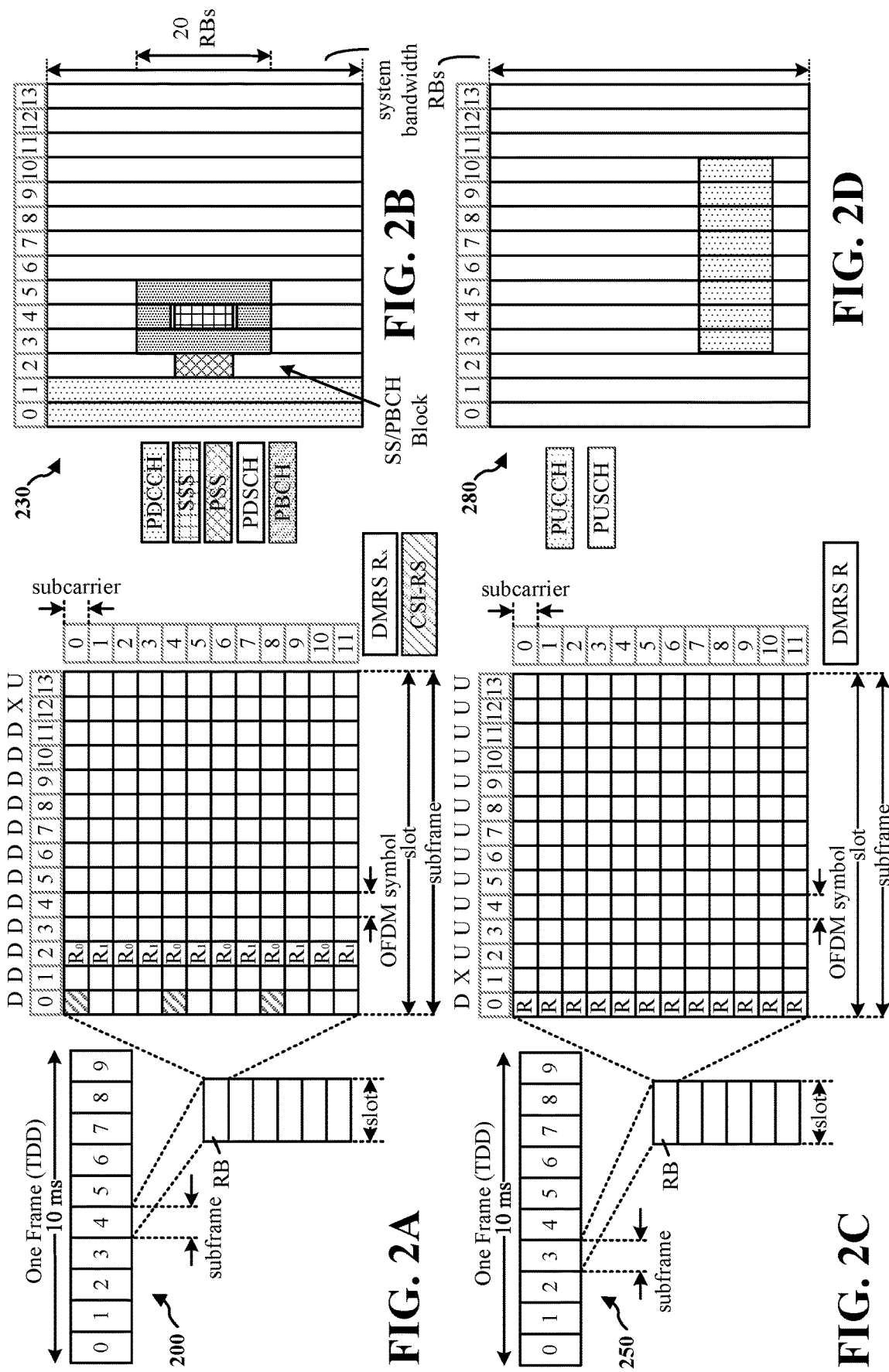
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
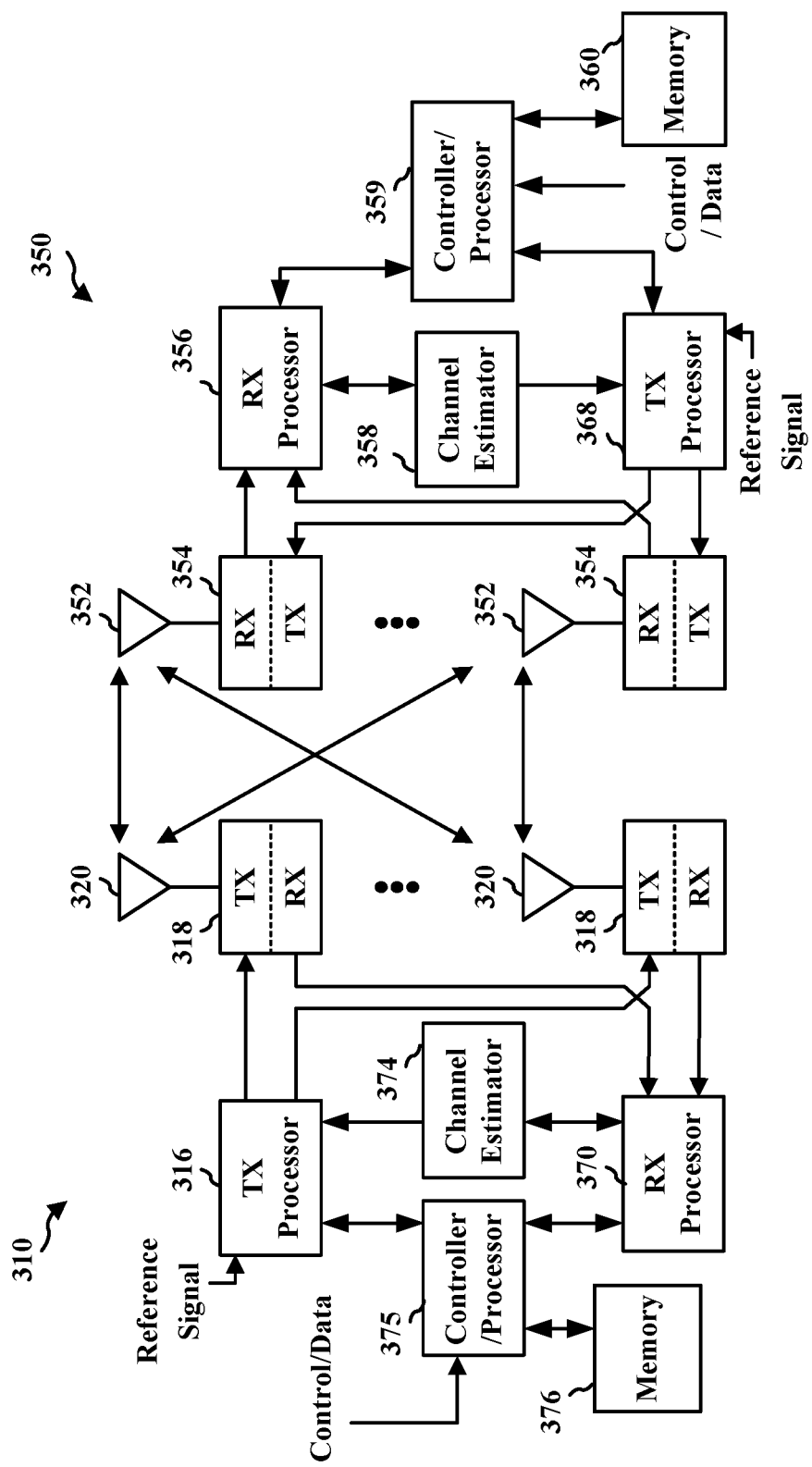
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the predictive model 198 of FIG. 1.

In some other aspects, at least one of the TX processor 316, the RX processor 370, and the controller/processor 375 may be configured to perform aspects in connection with the predictive model 198 of FIG. 1.

In various wireless communications systems, a base station may schedule communication (e.g., downlink transmissions) with a UE based on the conditions or quality of the channel on which the base station and the UE communicate. For example, the base station may transmit a reference signal to the UE, and the UE may determine (e.g., measure) one or more values indicative of the channel conditions based on reception of the reference signal. Examples of the one or more values include a reference signal received power (RSRP), a channel coefficient at one or more tones, CQI, PMI, and/or RI. The UE may transmit CSI to the base station that indicates the one or more measured values and, based on the CSI, the base station may schedule communication with the UE.

The foregoing approach to informing the base station of channel conditions may suffer from some issues, such as the delay between the time at which the UE measures the one or more values and the time at which the base station receives the CSI. One technique for avoiding this delay may be for the UE to transmit reference signals to the base station, and the base station may measure one or more values indicative of channel conditions based on reception of the reference signals from the UE. However, this technique may be ineffective for downlink communication when channel reciprocity does not hold between the uplink channel and the downlink channel, as may be the case in frequency-division duplex (FDD) systems.

The issues (e.g., delay) experienced due to CSI reporting by a UE may be exacerbated when the UE is in a high-mobility state (e.g., when the UE is traveling at relatively high rates of speeds), as the high-mobility state may introduce the Doppler effect to communication between the UE and the base station thereby making CSI reporting by the UE time-variant. In other words, the faster the UE is moving, the faster channel conditions change over time. Thus, the coherence time of the channel between the UE and the base station may be due to the high-mobility state of the UE may be less than the delay experienced during CSI reporting by the UE. Consequently, the CSI reported by the UE and used by the base station for scheduling may not accurately reflect the current channel conditions, which may cause a degradation in performance of communication between the base station and the UE (e.g., lower data rates and/or high decoding error rates).

In order to mitigate the issues associated with CSI reporting in high-mobility environments, the UE and/or base station may determine (e.g., estimate, predict, etc.) the predicted CSI based on past observed CSI. Determination of predicted CSI may rely on multiple CSI reports from the past. For example, five channel coefficients at 0, 10, 20, 30, 40, 50 ms may be used to estimate CSI in the range of 60-100 ms. Illustratively, the base station may send multiple reference signals to the UE in a relatively brief timespan—e.g., a reference signal at each of 0, 10, 20, 30, and 40 ms. The UE may receive the reference signals and determine CSI for each of the reference signals, which may be reported to the base station in one message or in a short duration. The base station may use the multiple CSI reports to estimate predicted CSI. However, using multiple CSI reports may introduce other issues to the determination of channel conditions. For example, the amount of CSI reporting may be relatively high, the UE may be better able to make a determination (e.g., estimation) of predicted CSI than the base station (e.g., due to blockages or changes to beamforming configuration at the UE in mmW systems that may affect reception of reference signals by the UE).

Accordingly, the present disclosure may describe techniques and approaches to determination (e.g., estimation, prediction, forecast, etc.) of predicted CSI based on past CSI using at least one parameter reported by the UE. The base station may evaluate a predictive model based on the at least one parameter reported by the UE. The base station may use the result of the evaluation as indicative of predicted CSI to schedule data and/or control information to be transmitted to the UE, thereby avoiding some of the issues commensurate with high-mobility environments.

Figure 4:
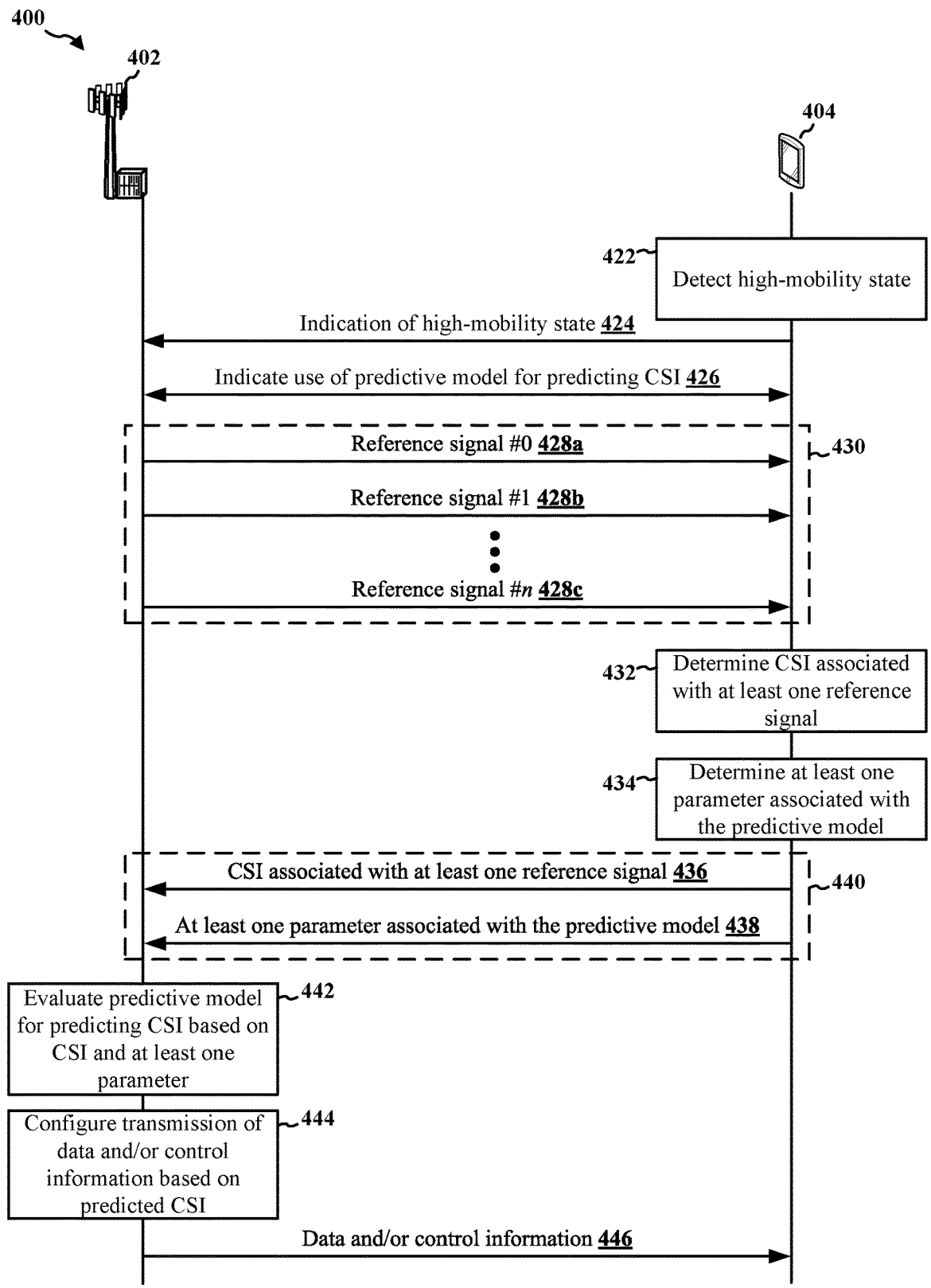
FIG. 4 is a call flow diagram illustrating a wireless communications system.

FIG. 4 is a call flow diagram illustrating a wireless communications system 400 including a base station 402 and a UE 404. The base station 402 may be implemented as the base station 102/180 and/or the base station 310, and the UE 404 may be implemented as the UE 104 and/or the UE 350.

According to various aspects, the UE 404 may be configured to detect 422 that the UE 404 is operating in a high-mobility state. A high-mobility state may be associated with a speed of the UE 404. Thus, the UE 404 may detect 422 that the UE is operating in the high-mobility state by, first, determining the speed at which the UE 404 is traveling (e.g., in miles or kilometers per hour) and, second, determining whether the speed satisfies (e.g., meets or exceeds) a threshold, which may indicate that the UE 404 is operating in the high-mobility state.

When the UE 404 detects 422 that the UE 404 is operating in the high-mobility state, the UE 404 may transmit an indication of the high-mobility state 424 to the base station 402. The base station 402 may receive the indication of the high-mobility state 424 and, therefore, may be aware that the UE 404 is operating in the high-mobility state and that channel conditions may rapidly change.

Based on the indication of the high-mobility state 424, the base station 402 and the UE 404 may communicate to acknowledge use of a predictive model associated with predicting CSI 426. The predictive model associated with predicting CSI may be at least one of a linear model, a higher-order model, and/or a neural network (or machine-learning) model. For example, the base station 402 may instruct the UE 404 that the predictive model associated with predicting CSI is to be used when the base station 402 receives the indication of the high-mobility state 424 from the UE 404, and the UE 404 may respond with an acknowledgement of the instruction.

In some aspects, when the base station 402 and the UE 404 communicate to acknowledge the use of the predictive model associated with the predicting CSI 426, the base station 402 and the UE 404 may select (e.g., negotiate) a predictive model to use to determine predicted CSI. The selection of the predictive model associated with predicting CSI may be based on a predefined rule known at the base station 402 and/or the UE 404, such as a predefined rule established by a standard or technical specification promulgated by a standards organization (e.g., 3GPP).

Subsequently, the base station 402 may send a bundle of reference signals 430 to the UE 404, which may include a first reference signal 428a, a second reference signal 428b, and so forth through an nth reference signal 428c. Each of the reference signals 428a-c may be associated with a respective time—e.g., the first reference signal 428a may be associated with 0 ms, the second reference signal 428b may be associated with 10 ms, and so forth until the nth reference signal 428c is associated with k ms (e.g., k may be equal to 50 ms in one example). Each of the reference signals 428a-c may be one of a CSI-RS, an SS/PBCH block, a DM-RS on a PDCCH, or a DM-RS on a PDSCH.

The UE 404 may receive each of the reference signals 428a-c of the bundle 430, and may determine at least one value based on each of the reference signals 428a-c. In some aspects, the UE 404 may perform a respective measurement performed on each of the reference signals 428a-c in order to determine the at least one value, such as a measurement to obtain an RSRP, a signal-to-noise ratio (SNR), a signal-to-interference-plus-noise ratio (SINR), a reference signal receive quality (RSRQ), a reference signal strength indicator (RSSI), and/or other similar value. In other aspects, the UE 404 may evaluate at least one function in order to obtain the at least one for each of the reference signals 428a-c. Potentially, the at least one function may take, as an input, at least one measurement performed by the UE 404 on one of the reference signals 428a-c.

Thus, based on one or more of the reference signals 428a-c, the UE 404 may determine at least one value that is an RSRP, a channel coefficient at one or more tones on which one of the reference signals 428a-c is received, a CQI, a PMI, and/or an RI. By way of illustration, the RSRP may be a value measured by the UE 404 for the power with which one of the reference signals 428a-c is received. A channel coefficient at one or more tones may be a coefficient associated with a channel including the one or more tones configured from a transmitter-side (e.g., base station 402) antenna to a receiver-side (e.g., UE 404) antenna, and additionally or alternatively, the channel coefficient may be derived by evaluating a predefined function that is based on and/or includes one or more variables corresponding to an amplitude, a channel gain, a phase, a time delay, a TX antenna element spacing, an RX antenna element spacing, an angle of departure, an angle of arrival, one or more multipath components of the transmitter side, and/or one or more multipath components of the receiver side.

Furthermore, a CQI may be a value (e.g., an integer, which may be bounded by a minimum value and/or maximum value) indicative of a quality of a channel on which the base station 402 and the UE 404 may communicate and, potentially, a TB size configured for uplink and/or downlink communication between the base station 402 and the UE 404 may be configured based on the CQI. According to one aspect, when the CQI is relatively higher, then the base station 402 may configure a larger TB size for communication with the UE 404 relative to another TB size configured by the base station 402 for communication with the UE 404 when the CQI is relatively lower.

Referring to a PMI, the UE 404 may use information conveyed by the PMI in order to indicate a set of weights determined by the UE 404 to by applied by the base station 402 during precoding of data and/or control information to be transmitted by the base station 402 to the UE 404. In some aspects, the PMI may be a value, e.g., the UE 404 may select one value from a set of preconfigured values. For example, the UE 404 may determine the one value from the set in order to increase (and potentially maximize) the quality (e.g., SNR, SINR, etc.) of data and/or control information to be transmitted by the base station 402 to the UE 404.

With respect to RI, the RI may be determined by the UE 404 so that correlation between a set of antennas (e.g., a set of TX antennas at the base station 402 used for downlink transmission to the UE 404) may be indicated to the base station 402. The UE 404 may determine the RI as one value from a set of RI values, and the set of RI values may be based on a MIMO configuration. For example, the set of RI values may be based on the number of streams and/or layers configured by the base station 402 for MIMO communication that includes the UE 404.

The UE 404 may determine 432 (e.g., generate) at least one CSI 436 from at least one of the determined values. For example, the UE 404 may generate the at least one CSI 436 as a set of one or more values, and each of the one or more values may be equal to or may be based on at least one of the RSRP, channel coefficient, CQI, PMI, and/or RI determined based on at least one of the reference signals 428*a-c*, e.g., such that the at least one CSI 436 corresponds with the at least one of the reference signals 428*a-c*. In some aspects, the UE 404 may determine 432 a respective CSI 436 for each of the received reference signals 428*a-c*. In such aspects, the UE 404 may associate each of the CSI 436 with a respective reference time for each of the reference signals 428*a-c*. For example, the UE 404 may associate a first CSI determined from the first reference signal 428*a* with 0 ms, the UE 404 may associate a second CSI determined from the second reference signal 428*b* with 10 ms, and so forth.

The UE 404 may designate one of the times associated with one of the CSI 436 as a reference time, which may be a time at which to begin determination of predicted CSI. For example, the UE 404 may designate the CSI determined based on an earliest-received one of the reference signals 428*a-c* as the reference time. Illustratively, the UE 404 may assign a reference time of 0 to the CSI determined based on the first reference signal 428*a* of the bundle 430.

The UE 404 may be able to determine parameters associated with predicting CSI with greater accuracy than the base station 402, e.g., the UE 404 may observe rapidly changing channel conditions in the high-mobility state. Therefore, the UE 404 may further determine 434 at least one parameter 438 associated with the predictive model. For example, the at least one parameter 438 may be a variable that may be provided for evaluation of the predictive model. Illustratively, the at least one parameter 438 may be a constant, variable, coefficient, scalar, and/or factor, such as an integer, number, vector, and/or series. According to various aspects, the UE 404 may determine 434 the at least one parameter 438 based on at least one CSI determined 432 from measurement(s) performed on one or more of the reference signals 428*a-c*.

In some aspects, the UE 404 may determine 434 at least two parameters 438 associated with the predictive model. Each of the at least two parameters 438 may be determined 434 based on one or more CSI determined 432 from measurement(s) performed on one or more of the reference signals 428*a-c* and/or function(s) evaluated based on the one or more reference signals 428*a-c*. For example, the UE 404 may determine 434 a first parameter based on CSI determined 432 from measurement(s) performed on the first reference signal 428*a* and, further, may determine 434 a second parameter based on CSI determined 432 from measurement(s) performed on the second reference signal 428*b*.

The UE 404 may transmit information indicating the at least one CSI 436 to the base station 402. In some aspects, when the UE 404 determines multiple CSI based on the bundle 430 of reference signals, the UE 404 may include all of the multiple CSI 436 in a single message 440. In addition, the UE 404 may transmit information indicating the at least one parameter 438 to the base station 402. In some aspects, the UE 404 may include the at least one parameter 438 in the single message 440 transmitted to the base station 402 along with the at least one CSI 436. The at least one CSI 436 and the at least one parameter 438 may enable a predicted CSI to be determined by the base station 402 based on the at least one CSI 436 and the at least one parameter 438.

In some aspects, the at least one parameter 438 and the at least one CSI 436 are transmitted by the UE 404 based on configuration information received from the base station 402. For example, the base station 402 may transmit configuration information to the UE 404, and the configuration information may indicate at least one of at least one resource that is to carry the at least one parameter 438 and the at least one CSI 436, a type of the at least one parameter 438, activation of the configuration information, deactivation of the configuration information, or a periodicity associated with CSI and/or parameter reporting by the UE 404. According to one aspect, the configuration information may be associated with the bundle 430 of reference signals 428*a-c*.

The base station 402 may receive the at least one CSI 436 and the at least one parameter 438 from the UE 404, for example, in a single message 440. Based on the at least one CSI 436 and the at least one parameter 438, the base station 402 may determine predicted CSI. "Predicted" CSI may be CSI that is associated with a future time, and therefore, the base station 402 may determine predicted CSI by estimating or forecasting information associated with the state of a channel on which the base station 402 and the UE 404 communicate.

In some aspects, predicted CSI may be determined using a predictive model. Thus, the base station 402 may evaluate 442 the predictive model, and the output or result of the evaluation of the predictive model may be equal to the predicted CSI. For example, the predictive model may be a linear model equal to $CSI(t)=CSI(0)+A\times t$, where $CSI(t)$ is the predicted CSI at time t, t is a time associated with the predicted CSI, A is the at least one parameter 438, and $CSI(0)$ is the at least one CSI 436 provided by the UE 404 in association with the reference time of 0. In another example, the predictive model may be a higher-order model equal to $CSI(t)=CSI(0)+A\times t+B\times t^2$, where B may be equal to another of the at least one parameter 438 provided by the UE 404 based on CSI.

In a further example, the predictive model may be based on at least two CSI 436—e.g., $CSI(t)=CSI(0)\times a1+CSI(1)+a2+b$, where a1, a2, and b are included in the at least one parameter 438, $CSI(0)$ may be the at least one CSI 436 associated with the reference time, and $CSI(1)$ may be another of the at least one CSI 436 associated with a subsequent time after the reference time. In still another example, the predictive model may include a neural network or machine-learning model, into which the base station 402 may input the at least one parameter 438 and the at least one CSI 436 in order to obtain an output indicative of predicted CSI (e.g., $CSI(t)$).

In evaluating 442 the predictive model, the base station 402 may obtain a value indicative of predicted CSI (e.g., $CSI(t)$). In some aspects, the base station 402 may quantize the at least one value obtained through evaluation of the predictive model. For example, RI may only be a positive integer (e.g., between 1 and 4 or between 1 and 8), and therefore, the base station 402 may quantize the at least one value as $RI(t)=\lfloor RI(0)+A\times t\rfloor$, where $RI(t)$ is the RI of the predicted CSI at time t, and $RI(0)$ is the RI of the at least one CSI 436 associated with the reference time 0 and provided by the UE 404.

From the evaluation 442 of the predictive model associated with predicted CSI, the base station 402 may configure 444 transmission of data and/or control information to the UE 404 based on the predicted CSI. For example, the base station 402 may schedule a set of time/frequency resources to carry the data and/or control information. Additionally or alternatively, the base station 402 may configure a set of transmission parameters according to which the base station 402 may transmit the data and/or control information. For example, the base station 402 may set a precoding matrix, a data rate, and/or coding scheme (e.g., modulation and coding scheme (MCS)) based on the predicted CSI. In some aspects, the base station 402 may transmit information indicating the configuration (e.g., schedule and/or transmission parameters) to the UE 404, so that the UE 404 may be configured for reception of the data and/or control information from the base station 402.

The base station 402 may then transmit the downlink data and/or control information 446 to the UE 404 based on the configuration. For example, the base station 402 may transmit the downlink data and/or control information on a set of resources configured based on the predicted CSI. As another example, the base station 402 may transmit the data and/or control information with a data rate and/or coding scheme (MCS) configured based on the predicted CSI. In a further example, the base station 402 may transmit the data and/or control information with weights and/or coefficients of antenna elements configured based on the predicted CSI.

The UE 404 may then receive the downlink data and/or control information 446 from the base station 402 based on the at least one CSI 436 and the at least one parameter 438. For example, the base station 402 may determine the predicted CSI based on the at least one CSI 436 and the at least one parameter 438 (e.g., based on evaluation 442 of the predictive model), and the base station 402 may transmit information indicating a transmission configuration that is based on the predicted CSI to the UE 404. The UE 404 may receive the transmission configuration (e.g., schedule for a set of resources, precoding matrix, data rate, coding scheme, etc.), and the UE 404 may receive the data and/or control information 446 from the base station 402 based on the transmission configuration. For example, the UE 404 may monitor the scheduled set of resources using antenna elements based on the precoding matrix in order to receive the data and/or control information 446, and then the UE 404 may decode the data and/or control information 446 based on the data rate and/or coding scheme included in the transmission configuration. Accordingly, the base station 402 and the UE 404 may be configured to better communicate when the UE 404 is in high-mobility environments.

Figure 5:
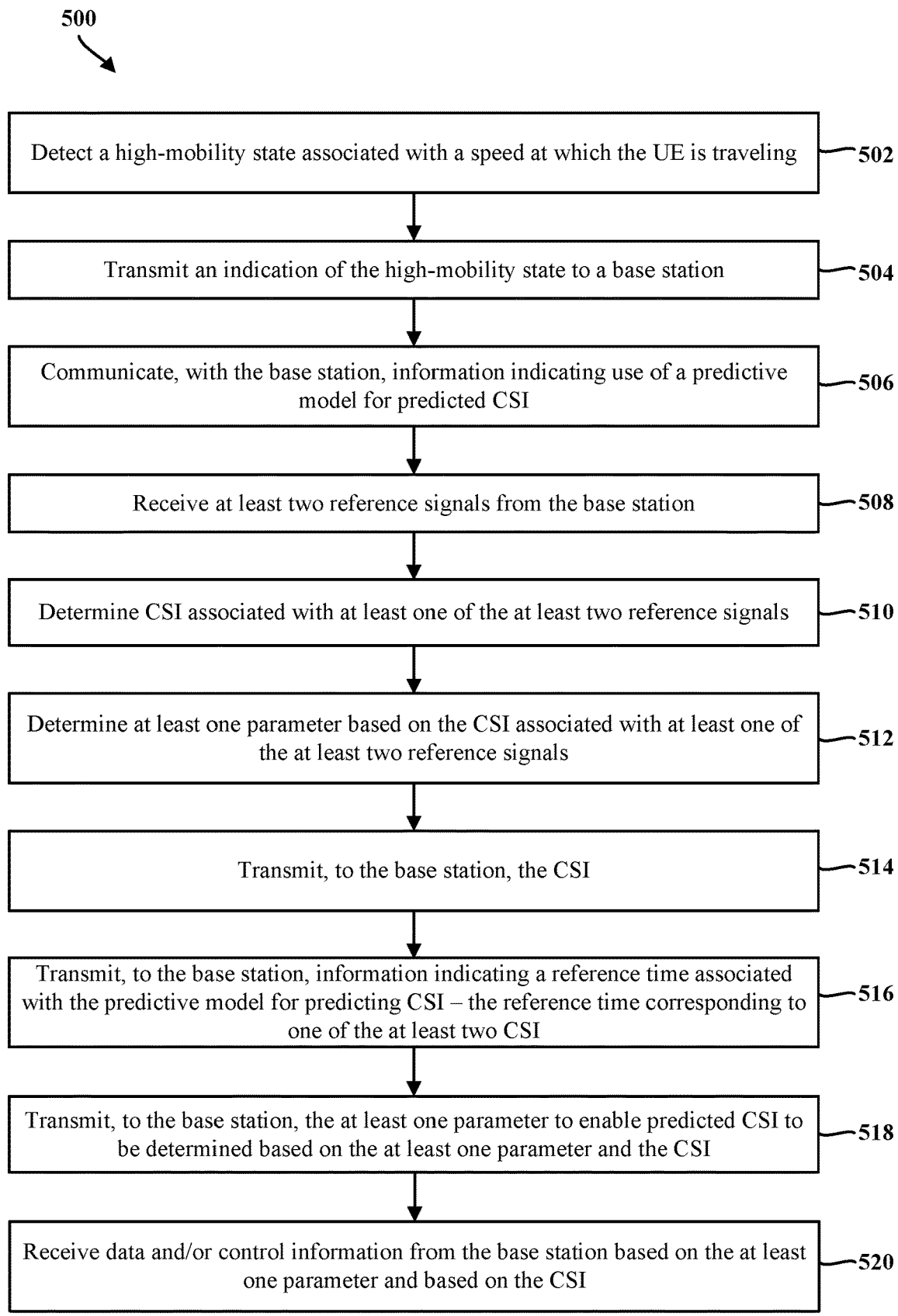
FIG. 5 is a flowchart of a method of wireless communication by a UE.

FIG. 5 is a flowchart of a method 500 of wireless communication. The method 500 may be performed by a UE (e.g., the UE 104, 350, 404; the apparatus 702/702'; the processing system 814, which may include the memory 360 and which may be the entire UE 350 or a component of the UE 350, such as the TX processor 368, the RX processor 356, and/or the controller/processor 359). According to various aspects, one or more of the illustrated operations of the method 500 may be transposed, omitted, and/or contemporaneously performed.

At 502, the UE may detect a high-mobility state associated with a speed at which the UE is traveling. The UE may detect the high-mobility state by, first, determining a speed at which the UE is traveling, second, comparing the speed to a predefined threshold, and third, determining whether the speed satisfies (e.g., meets or exceeds) the threshold. When the UE determines that the speed satisfies the predefined threshold, then the UE may determine that the high-mobility state is detected; however, the UE may determine that the high-mobility state is undetected when the UE determines that the speed fails to satisfy (e.g., is less than) the predefined threshold. For example, referring to FIG. 4, the UE 404 may detect 422 a high-mobility state in which the UE 404 is traveling, such as by determining the speed at which the UE 404 is traveling, and determining whether the speed satisfies a threshold associated with the high-mobility state.

At 504, the UE may transmit an indication of the high-mobility state to a base station. For example, referring to FIG. 4, the UE 404 may transmit the indication of the high-mobility state 424 to the base station 402.

At 506, the UE may communicate, with the base station, information indicating use of a predictive model associated with predicting CSI. For example, the UE may negotiate with the base station to select a predictive model based on a predefined rule, such as a predefined rule indicated in a standard set by a standards organization. In some aspects, the UE may negotiate with the base station by receiving a request to use one predictive model selected from a plurality of potential predictive models and by transmitting an acknowledgement of the request to use the one predictive model to the base station, or vice versa. In some other aspects, the UE may negotiate with the base station by receiving a first request to use one predictive model selected from a plurality of potential predictive models from the base station and by transmitting a second request to use a different predictive model selected from the plurality of potential predictive models to the base station, or vice versa. In such other aspects, the UE may then receive from the base station or transmit to the base station an acknowledgement of the second request to use the different predictive model in response to the second request. The predictive model may be at least one of a linear model, a higher-order model, and/or a neural network model. For example, referring to FIG. 4, the UE 404 may communicate with the base station 402 to acknowledge use of the predictive model associated with predicting CSI 426.

At 508, the UE may receive at least two reference signals from the base station. The at least two reference signals may be considered to be bundled (e.g., as CSI may not be reported immediately after reception of each of the at least two reference signals). According to various aspects, the at least two reference signals may include at least one of a CSI-RS, an SS/PBCH block, a DM-RS on a PDCCH, or a DM-RS on a PDSCH. For example, referring to FIG. 4, the UE 404 may receive the bundle 430 of reference signals 428a-c from the base station 402.

At 510, the UE may determine CSI associated with at least one of the at least two reference signals. For example, the UE may first determine (e.g., measure) one or more values indicative of a channel quality based on one or more of the at least two reference signals. The one or more values may include at least one of an RSRP, a signal-to-noise ratio (SNR), a SINR, a RSRQ, a RSSI, and/or other similar value. Next, the UE may determine at least one of a CQI, PMI, PMI, and/or RI based on the one or more determined values, such as by evaluating at least one predefined function that takes at least one of the one or more values as an input and returns at least one of the CQI, PMI, PMI, and/or RI as an output. According to some aspects, the UE may determine respective CSI for each of the at least two reference signals. The UE may associate one of the CSI with a reference time, which may be a time (e.g., slot) at which the base station is to consider as the first CSI. The UE may associate the CSI determined from an earliest-received one of the at least two reference signals with a reference time (e.g., as CSI(0)). For example, referring to FIG. 4, the UE 404 may determine 432 at least one CSI 436 associated with at least one of the bundle 430 of reference signals 428a-c.

At 512, the UE may determine at least one parameter based on the CSI. The UE may determine the at least one parameter in association with the predictive model associated with predicting CSI, which may be selected through negotiation between the UE and the base station. For example, first, the UE may determine the predictive model to be used by the base station to determine the predicted CSI and, second, the UE may determine the at least one parameter that is to be used for evaluating the predictive model. Potentially, the UE may further determine the at least one parameter by calculating or computing the at least one parameter based on the CSI. In some aspects, the UE may determine at least two parameters associated with the predictive model, such as by determining a respective parameter based on a respective CSI associated with at least one of the at least two reference signals. For example, referring to FIG. 4, the UE 404 may determine 434 at least one parameter 438 based on the at least one CSI 436 determined 432 from at least one of the reference signals 428a-c.

At 514, the UE may transmit, to the base station, the CSI. In some aspects, the UE may transmit multiple CSI associated with multiple of the at least two reference signals to the base station in a single message, for example, based on the bundled reference signals received from the base station. For example, referring to FIG. 4, the UE 404 may transmit, to the base station 402, the at least one CSI 436 associated with at least one of the at least two reference signals 428a-c.

At 516, the UE may transmit, to the base station, information indicating a reference time associated with the predictive model associated with predicting CSI. For example, the UE may indicate which of the multiple CSI is associated with an earliest-received one of the reference signals. For example, referring to FIG. 4, the UE 404 may transmit, to the base station 402, information indicating a reference time associated with the predictive model associated with predicting CSI.

At 518, the UE may transmit, to the base station, the at least one parameter to enable predicted CSI to be determined based on the at least one parameter and the CSI. In some aspects, the UE may transmit multiple parameters to the base station in association with the predictive model associated with predicting CSI. The at least one parameter may be included in a single message, which may further include the at least one CSI transmitted to the base station. For example, referring to FIG. 4, the UE 404 may transmit, to the base station 402, the at least one parameter 438 associated with the predictive model associated with predicting CSI, such as in the single message 440 with the at least one CSI 436.

At 520, the UE may receive data and/or control information from the base station based on the at least one parameter and based on the CSI. In some aspects, the UE may receive a transmission configuration from the base station, and the transmission configuration may configure the UE to receive the data and/or control information from the base station. For example, the transmission configuration may indicate a set of resources on which the data and/or control information is carried, a precoding matrix, a data rate, a coding rate, and the like. For example, referring to FIG. 4, the UE 404 may receive the data and/or control information from the base station 402, which may be configured (e.g., scheduled) by the base station 402 based on the at least one CSI 436 and the at least one parameter 438 transmitted to the base station 402 from the UE 404.

Figure 6:
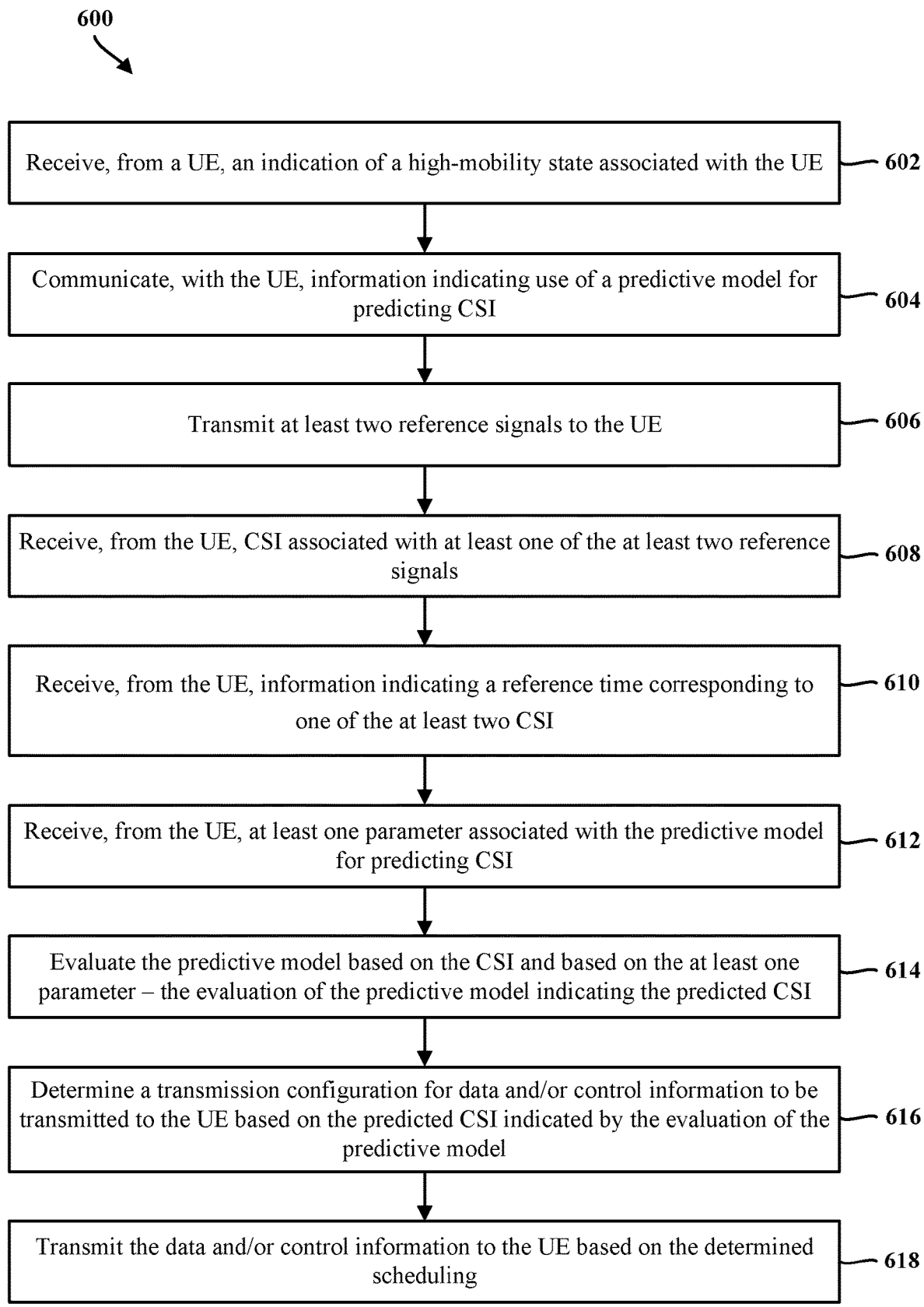
FIG. 6 is a flowchart of a method of wireless communication by a base station.

FIG. 6 is a flowchart of a method 600 of wireless communication. The method 600 may be performed by a base station (e.g., the base station 102/180, 310, 402; the apparatus 902/902'; the processing system 1014, which may include the memory 376 and which may be the entire base station 310 or a component of the base station 310, such as the TX processor 316, the RX processor 370, and/or the controller/processor 375). According to various aspects, one or more of the illustrated operations of the method 600 may be transposed, omitted, and/or contemporaneously performed.

At 602, the base station may receive, from a UE, an indication of a high-mobility state associated with the UE. The indication of the high-mobility state may indicate that the speed and/or acceleration of the UE satisfies (e.g., meets or exceeds) a predefined speed threshold and/or predefined acceleration threshold, respectively. For example, referring to FIG. 4, the base station 402 may receive, from the UE 404, the indication of the high-mobility state 424, which may be associated with a speed at which the UE 404 is traveling.

At 604, the base station may communicate, with the UE, information acknowledging use of a predictive model associated with predicting CSI. The predictive model may be at least one of a linear model, a higher-order model, and/or a neural network model. The base station may negotiate with the UE to select a predictive model based on a predefined rule, such as a predefined rule indicated in a standard set by a standards organization. In some aspects, the base station may negotiate with the UE by transmitting a request to use one predictive model selected from a plurality of potential predictive models and by receiving an acknowledgement of the request to use the one predictive model from the UE, or vice versa. In some other aspects, the base station may negotiate with the UE by transmitting a first request to use one predictive model selected from a plurality of potential predictive models and by receiving a second request to use a different predictive model selected from the plurality of potential predictive models from the UE, or vice versa. In such other aspects, the base station may then transmit to the UE or receive from the UE an acknowledgement of the second request to use the different predictive model in response to the second request. For example, referring to FIG. 4, the base station 402 may communicate with the UE 404 to acknowledge use of the predictive model associated with predicting CSI 426.

At 606, the base station may transmit at least two reference signals to the UE. The at least two reference signals may be considered to be bundled (e.g., as CSI may not be reported immediately after reception of each of the at least two reference signals). According to various aspects, the at least two reference signals may include at least one of a CSI-RS, an SS/PBCH block, a DM-RS on a PDCCH, or a DM-RS on a PDSCH. For example, referring to FIG. 4, the base station 402 may transmit the bundle 430 of reference signals 428a-c to the UE 404.

At 608, the base station may receive, from the UE, CSI associated with at least one of the at least two reference signals. In some aspects, the base station may receive respective CSI associated with each of the at least two reference signals, which may be bundled in a single message. For example, referring to FIG. 4, the base station 402 may receive, from the UE 404, the CSI 436 associated with at least one of the bundle 430 of reference signals 428a-c.

At 610, the base station may receive, from the UE, information indicating a reference time corresponding to one of at least two CSI received from the UE. For example, the base station may receive, from the UE, information indicating which of multiple CSI is associated with an earliest-transmitted one of the reference signals. The reference time may be a time (e.g., a slot) from which the base station is to count from when evaluating the predictive model associated with predicting CSI. For example, referring to FIG. 4, the base station 402 may receive, from the UE 404, information indicating a reference time associated with the predictive model associated with predicting CSI.

At 612, the base station may receive, form the UE, at least one parameter associated with the predictive model associated with predicting CSI. In some aspects, the base station may receive multiple parameters associated with the predictive model, such as a respective parameter associated with each of multiple CSI received from the UE. For example, referring to FIG. 4, the base station 402 may receive, from the UE 404, at least one parameter 438 associated with the predictive model associated with predicting CSI.

At 614, the base station may evaluate the predictive model based on the CSI and based on the at least one parameter. Accordingly, the base station may determine predicted CSI based on the evaluation of the predictive model. For example, the base station may input the CSI and the at least one parameter into the predictive model as variables, and obtain a result from the evaluation of the predictive model that indicates predicted CSI. Further, the base station may evaluate the predictive model based on the received reference time—e.g., the reference time may be a time (e.g., a slot) from which the base station is to count from when evaluating the predictive model associated with predicting CSI. In some aspects, the base station may evaluate the predictive model based on multiple CSI and/or based on multiple parameters received from the UE, for example, based on the selection of the predictive model acknowledged between the base station and the UE. For example, referring to FIG. 4, the base station 402 may evaluate 442 the predictive model associated with predicted CSI based on the at least one CSI 436 and based on the at least one parameters 438.

Potentially, the base station may select the predictive model from a plurality of potential predictive models, and the base station may communicate (e.g., transmit and/or receive) information with the UE in order to determine which predictive model the base station is to select. For example, the base station may negotiate with the UE in order to select the predictive model from the plurality of potential predictive model, such as by transmitting a request to use the predictive model to the UE and receiving an acknowledgement of the request to use the predictive model from the UE, or vice versa. In another example of negotiation, the base station may transmit a request to use the predictive model to the UE and receive another request to use a different predictive model from the UE, or vice versa. In some aspects, the base station may quantize at least one value obtained from evaluation of the predictive model, and the quantized at least one value may be used as predicted CSI.

At 616, the base station may determine a transmission configuration for data and/or control information to be transmitted to the UE based on the predicted CSI indicated by the evaluation of the predictive model. In some aspects, the base station may first select a set of resources, e.g., based on the predicted CSI indicated by the evaluation of the predictive model. Illustratively, the base station may estimate that the channel quality associated with each of the set of resources is acceptable to carry information to the UE—e.g., the base station may estimate, based on the predicted CSI, that interference on each of the set of resources is unlikely to prevent the UE from successfully receiving and decoding information to be carried on each of the set of resources. Next, the base station may assign data and/or control information intended for the UE to the set of resources—e.g., the base station may map a set of bits corresponding to at least a portion of the data and/or control information to each of the set of resources. In some other aspects, the base station may configure a precoding matrix, data rate, and/or coding scheme for transmission of the data and/or control information. For example, referring to FIG. 4, the base station 402 may configure 444 transmission of data and/or control information for the UE 404 based on the predicted CSI obtained from the evaluation 442 of the predictive model.

At 618, the base station may transmit data and/or control information to the UE based on the determined transmission configuration. For example, referring to FIG. 4, the base station 402 may transmit data and/or control information 446 to the UE 404 based on the scheduling 444 by the base station 402.

Figure 7:
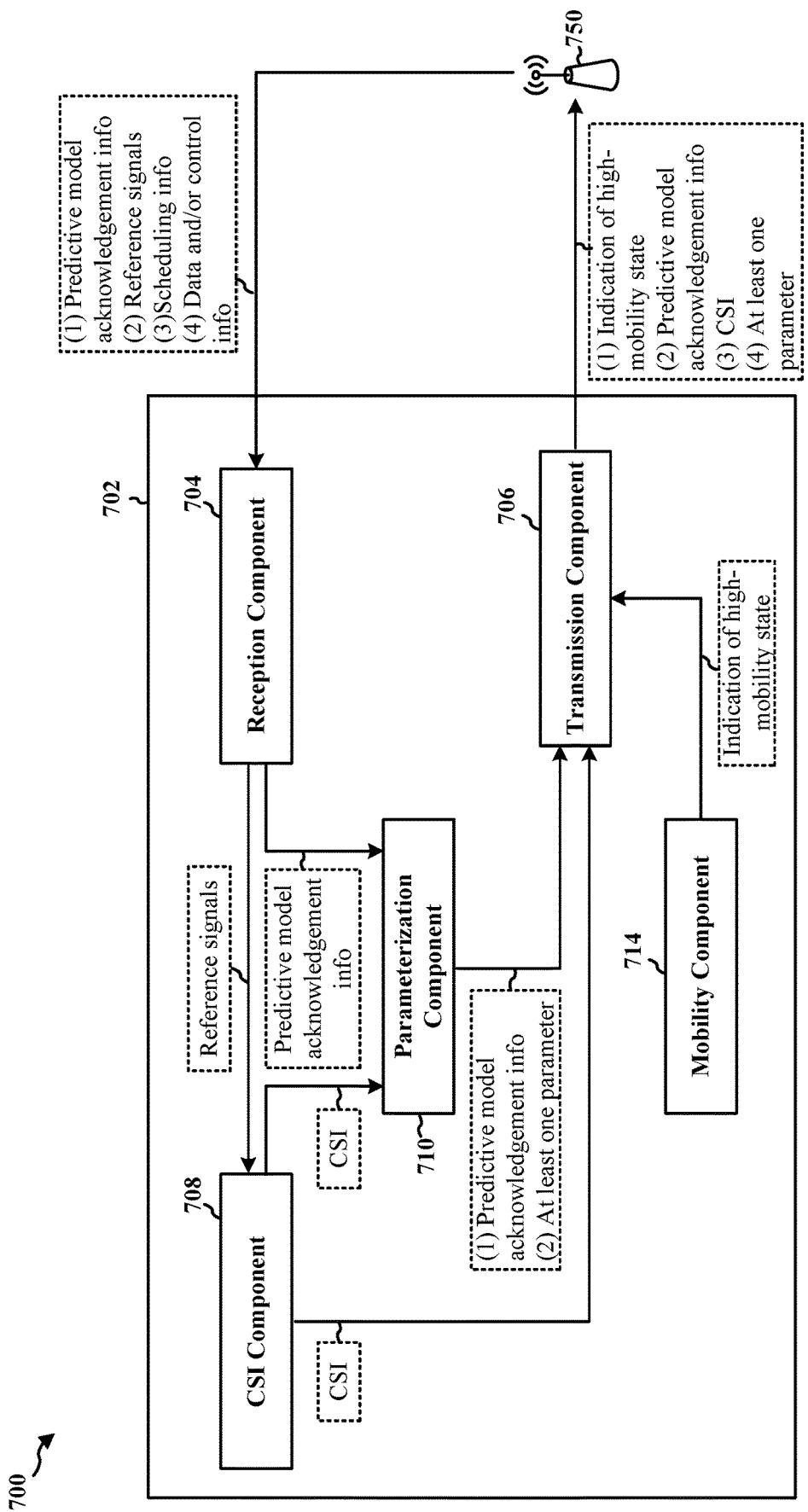
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus 702 may be a UE. The apparatus 702 may include a reception component 704 for receiving signals from a base station 750. The apparatus 702 may further include a transmission component 706 for transmitting signals to the base station 750.

According to various aspects, the apparatus 702 may include a mobility component 714 that may be configured to detect a high-state associated with a speed at which the apparatus 702 is traveling, e.g., as described in connection with 502 of FIG. 5. The transmission component 706 may transmit information indicating the high-mobility state to the base station 750, e.g., as described in connection with 504 of FIG. 5.

The apparatus 702 may include a parameterization component 710. The parameterization component 710 (e.g., in cooperation with the reception component 704 and/or the transmission component 706) may communicate, with the base station 750, information indicating use of a predictive model associated with predicting CSI, e.g., as described in connection with 506 of FIG. 5.

The reception component 704 may receive at least two reference signals from the base station 750, e.g., as described in connection with 508 of FIG. 5. The apparatus 702 may include a CSI component 708, and the CSI component 708 may be configured to determine CSI associated with at least one of the at least two reference signals, e.g., as described in connection with 510 of FIG. 5. Additionally, the parameterization component 710 may be configured to determine at least one parameter associated with the predictive model based on the CSI associated with at least one of the at least two reference signals, e.g., as described in connection with 512 of FIG. 5.

The transmission component 706 may transmit the CSI associated with at least one of the at least two reference signals to the base station 750, e.g., as described in connection with 514 of FIG. 5. Additionally, the transmission component 706 may transmit, to the base station 750, information indicating a reference time associated with the predictive model, e.g., as described in connection with 516 of FIG. 5. Further, the transmission component 706 may transmit the at least one parameter associated with the predictive model to the base station 750, e.g., as described in connection with 518 of FIG. 5. The reception component 704 may receive data and/or control information from the base station 750, e.g., according to a transmission configuration determined by the base station 750 based on the CSI and at least one parameter transmitted to the base station 750, e.g., as described in connection with 520 of FIG. 5.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
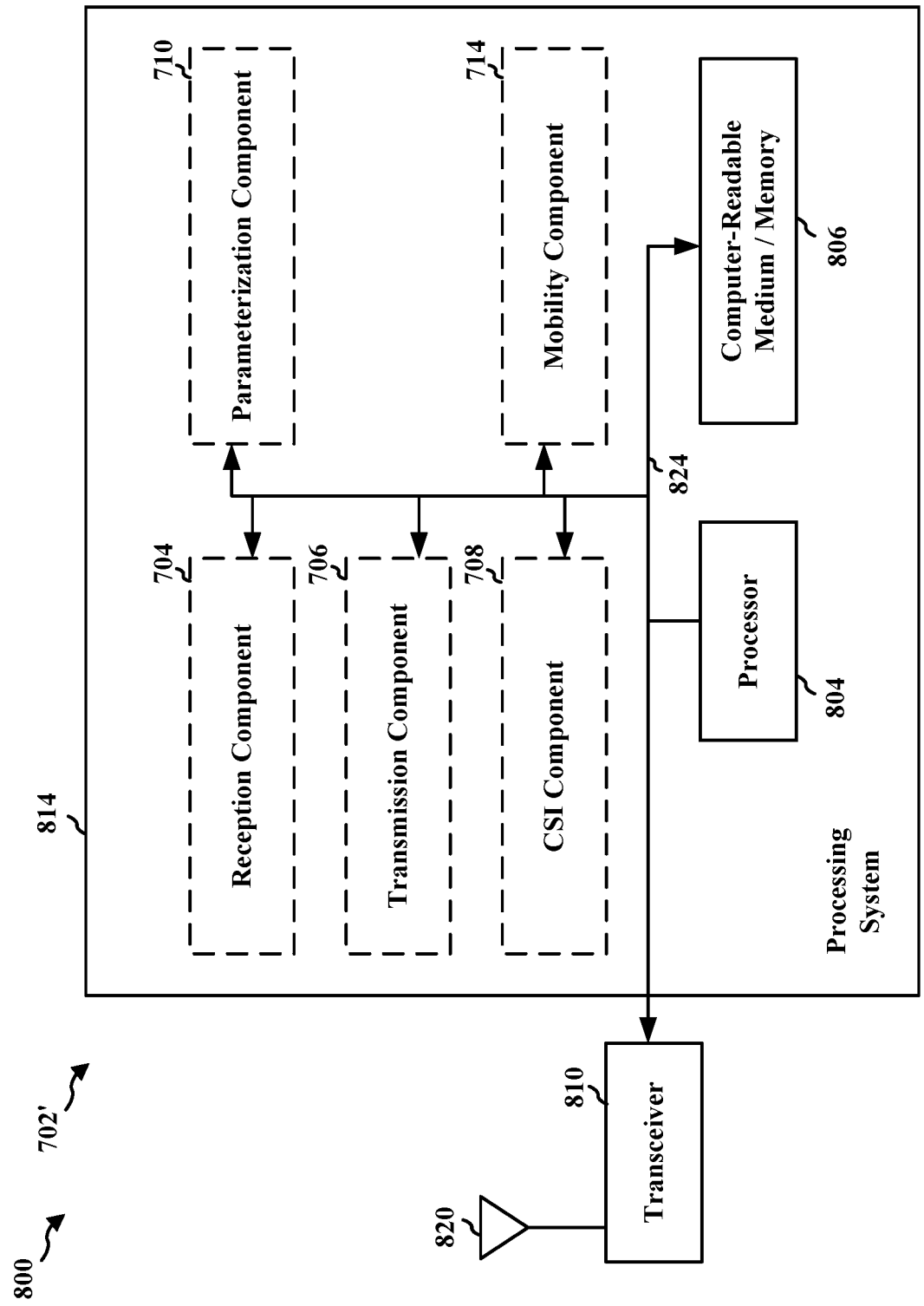
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 714. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (see, e.g., 350 of FIG. 3).

In one configuration, the apparatus 702/702' for wireless communication includes means for receiving at least two reference signals from a base station. The apparatus 702/702' includes means for determining CSI associated with at least one of the at least two reference signals. The apparatus 702/702' includes means for determining at least one parameter based on the CSI. The apparatus 702/702' includes means for transmitting, to the base station, the at least one parameter and the CSI to enable predicted CSI to be determined based on the at least one parameter and the CSI. The apparatus 702/702' includes means for receiving data or control information from the base station based on the at least one parameter and based on the CSI.

In one aspect, each of the at least two reference signals may be one of a CSI-RS, SS/PBCH block, a DM-RS carried on a PDSCH, or a DM-RS carried on a PDCCH. In one aspect, the at least two reference signals are asynchronously received. In one aspect, the apparatus 702/702' may further include means for communicating, with the base station, information indicating use of the predictive model associated with predicting CSI, and the at least one parameter is determined based on the information acknowledging the use of the predictive model associated with predicting CSI.

In one aspect, the apparatus 702/702' may further include means for detecting a high-mobility state, wherein the high-mobility state is associated with a speed at which the apparatus is traveling; and means for transmitting an indication of the high-mobility state to the base station, wherein the information acknowledging the use of the predictive model associated with predicting CSI is communicated with the base station based on the detection of the high-mobility state.

In one aspect, the CSI associated with at least one of the at least two reference signals comprises at least two CSI that each corresponds with a respective one of the at least two reference signals. In one aspect, the apparatus 702/702' may further include means for transmitting, to the base station, information indicating a reference time associated with the predictive model associated with predicting CSI, and the reference time corresponds to one of the at least two CSI. In one aspect, the at least one parameter and each of the at least two CSI are transmitted to the base station in a single message.

In one aspect, the CSI includes at least one of a RI associated with a first reference signal of the at least two reference signals, a PMI associated with the first reference signal, a CQI associated with the first reference signal, a channel coefficient at one or more tones associated with the first reference signal, or a RSRP associated with the first reference signal. In one aspect, the at least one parameter comprises at least two different parameters. In one aspect, the predictive model comprises at least one of a linear model, a higher-order model, or a neural network model. In one aspect, the predictive model is determined based on a predefined rule.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
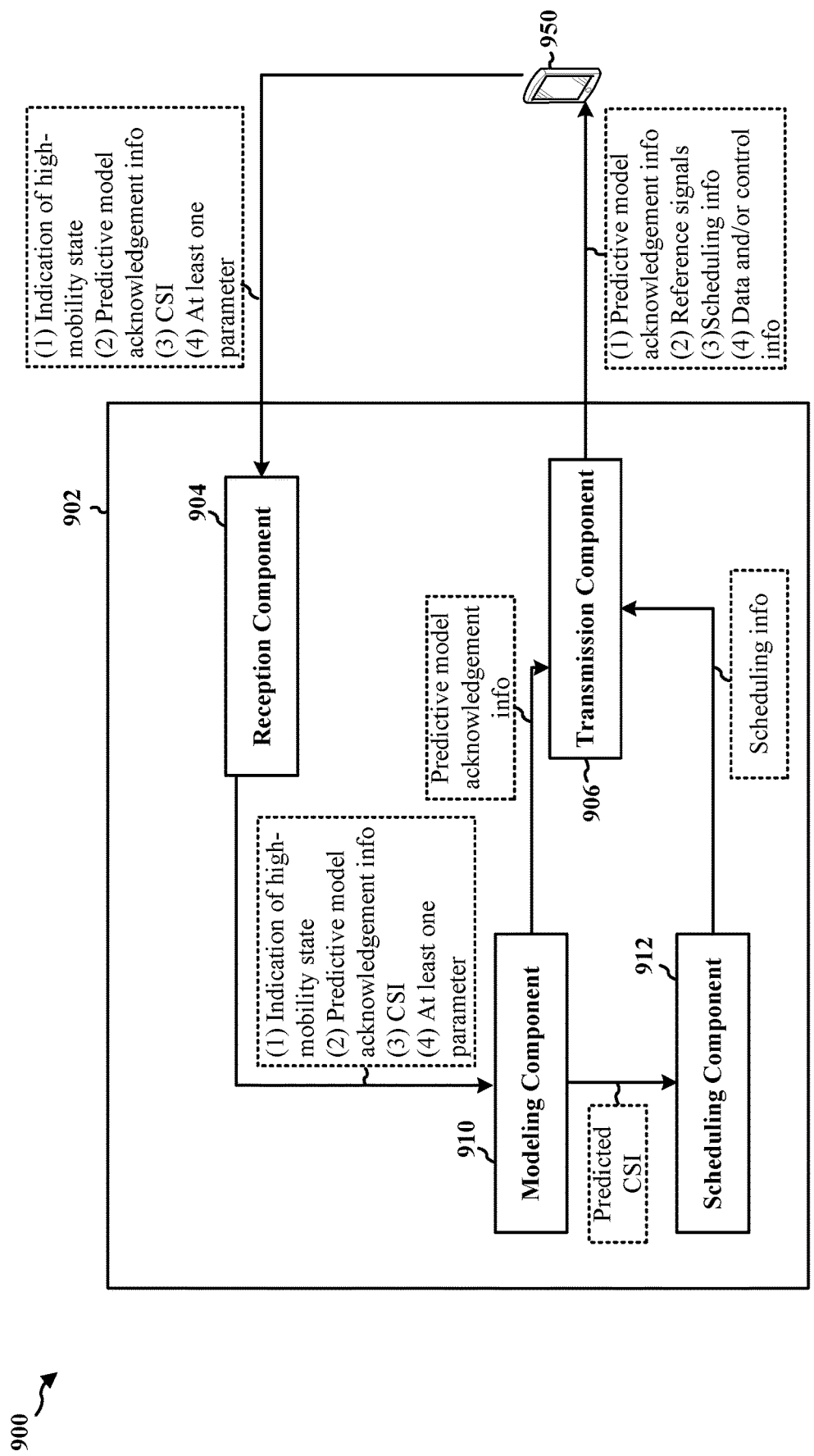
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus 902 may be a base station. The apparatus 902 includes a reception component 904 that receives signals from a UE 950. The apparatus 902 further includes a transmission component 906 that transmits signals to the UE 950.

According to various aspects, the reception component 904 may receive an indication of a high-mobility state associated with the UE 950, e.g., as described in connection with 602 of FIG. 6. The indication of the high-mobility state may be provided to a modeling component 910. The modeling component 910 may communicate with the UE 950 to acknowledge use of a predictive model associated with predicting CSI (e.g., based on the indication of the high-mobility state), e.g., as described in connection with 604 of FIG. 6.

The transmission component 906 may transmit at least two reference signals to the UE 950, e.g., as described in connection with 606 of FIG. 6. Based on the at least two reference signals, the reception component 904 may receive, from the UE 950, CSI associated with at least one of the at least two reference signals, e.g., as described in connection with 608 of FIG. 6. The reception component 904 may further receive, from the UE 950, information indicating a reference time associated with one of at least two CSI received from the UE 950, e.g., as described in connection with 610 of FIG. 6. The reception component 904 may further receive, from the UE 950, at least one parameter associated with the predictive model associated with predicting CSI, e.g., as described in connection with 612 of FIG. 6.

The CSI, reference time, and at least one parameter may be provided to the modeling component 910. The modeling component 910 may be configured to determine predicted CSI based on the CSI and based on the at least one parameter. For example, the modeling component 910 may evaluate the predictive model based on the CSI and based on the at least one parameter, e.g., as described in connection with 614 of FIG. 6. The evaluation of the predictive model may yield predicted CSI, which may be provided to a scheduling component 912.

The scheduling component 912 may determine a transmission configuration (e.g., schedule and/or transmission parameters) for data and/or control information to be transmitted to the UE 950 based on the predicted CSI e.g., as described in connection with 616 of FIG. 6. The scheduling component 912 may provide transmission configuration to the transmission component 906. The transmission component 906 may transmit data and/or control information to the UE 950 based on the transmission configuration, e.g., as described in connection with 618 of FIG. 6.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
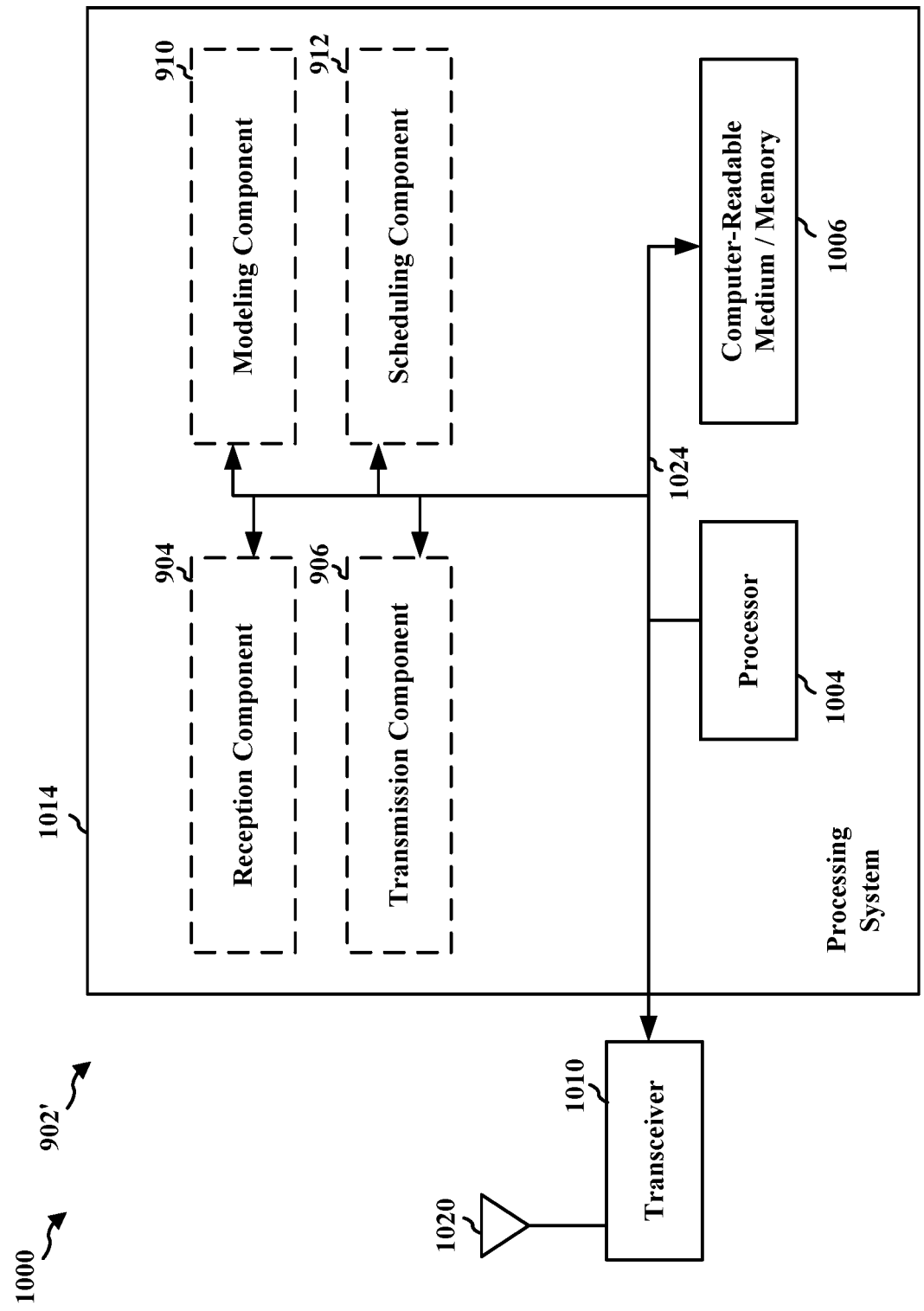
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 910, 912, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006.

The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 910, 912. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375. Alternatively, the processing system 1014 may be the entire base station (e.g., see 310 of FIG. 3).

In one configuration, the apparatus 902/902' for wireless communication includes means for transmitting at least two reference signals to a UE. The apparatus 902/902' includes means for receiving, from the UE, CSI associated with at least one of the at least two reference signals. The apparatus 902/902' includes means for receiving, from the UE, at least one parameter associated with the CSI. The apparatus 902/902' includes means for determining predicted CSI based on the CSI and based on the at least one parameter. The apparatus 902/902' includes means for transmitting, to the UE, data or control information that is scheduled based on the predicted CSI.

In one aspect, the apparatus 902/902' may include means for evaluating a predictive model based on the CSI and based on the at least one parameter, and the evaluation of the predictive model indicates predicted CSI.

In one aspect, each of the at least two reference signals comprises one of a CSI-RS, a SS/PBCH block, a DM-RS carried on a PDSCH, or a DMRS carried on a PDCCH. In one aspect, the at least two reference signals are asynchronously transmitted. In one aspect, the apparatus 902/902' further includes means for communicating, with the UE, information indicating use of the predictive model associated with the predicted CSI, wherein the at least one parameter is received based on the information indicating the use of the predictive model associated with the predicted CSI.

In one aspect, the apparatus 902/902' further includes means for receiving an indication of a high-mobility state associated with the UE, wherein the information indicating the use of the predictive model associated with the predicted CSI is communicated with the UE based on the indication of the high-mobility state associated with the UE. In one aspect, the CSI associated with at least one of the at least two reference signals comprises at least two CSI that each corresponds with a respective one of the at least two reference signals, and wherein the evaluation of the predictive model is based on each of the at least two CSI.

In one aspect, the apparatus 902/902' further includes means for receiving, from the UE, information indicating a reference time corresponding to one of the at least two CSI, wherein the evaluation of the predictive model is based on the reference time. In one aspect, the at least one parameter and each of the at least two CSI are received from the UE in a single message. In one aspect, the CSI comprises at least one of a RI associated with a first reference signal of the at least two reference signals, a PMI associated with the first reference signal, a CQI associated with the first reference signal, a channel coefficient at one or more tones associated with the first reference signal, or a RSRP associated with the first reference signal.

In one aspect, the at least one parameter comprises at least two different parameters, and wherein the evaluation of the predictive model is based on each of the at least two parameters. In one aspect, the predictive model comprises at least one of a linear model, a higher-order model, or a neural network model. In one aspect, the apparatus 902/902' further includes means for quantizing at least one value associated with the predicted CSI based on the evaluation of the predictive model, wherein the data or control information is scheduled based on the quantized at least one value. In one aspect, the predictive model is determined based on a predefined rule.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving, from a base station, at least two reference signals;
   determining channel state information (CSI) associated with at least one of the at least two reference signals;
   transmitting, to the base station, an acknowledgement of a received request to select a predictive model from a plurality of predictive models;
   determining at least one parameter associated with the predictive model based on the CSI;
   transmitting, to the base station, the at least one parameter and the CSI to enable a predicted CSI to be determined with the predictive model based on the at least one parameter and the CSI; and
   receiving, from the base station, data or control information that is scheduled based on the predicted CSI.

2. The method of claim 1, further comprising:
   communicating, with the base station, information indicating use of the predictive model associated with the predicted CSI,
   wherein the at least one parameter is determined based on the information indicating the use of the predictive model associated with the predicted CSI.

3. The method of claim 2, wherein the predictive model comprises at least one of a linear model, a higher-order model, or a neural network model.

4. The method of claim 2, wherein the communicating the information indicating the use of the predictive model is based on a predefined rule associated with the use of the predictive model.

5. The method of claim 2, further comprising:
   detecting a high-mobility state, wherein the high-mobility state is associated with a speed of the UE; and
   transmitting an indication of the high-mobility state to the base station,
   wherein the communicating, with the base station, the information indicating the use of the predictive model associated with the predicted CSI is based on the high-mobility state.

6. The method of claim 1, wherein the CSI associated with the at least one of the at least two reference signals comprises at least two CSI that each corresponds with a respective one of the at least two reference signals.

7. The method of claim 6, further comprising:
   transmitting, to the base station, information indicating a reference time associated with the predictive model associated with the predicted CSI,
   wherein the reference time corresponds to one of the at least two CSI.

8. The method of claim 1, wherein the CSI comprises at least one of a rank indicator (RI) associated with a first reference signal of the at least two reference signals, a precoding matrix indicator (PMI) associated with the first reference signal, a channel quality indicator (CQI) associated with the first reference signal, a channel coefficient associated with one or more tones, or a reference signal received power (RSRP) associated with the first reference signal.

9. The method of claim 1, wherein the at least one parameter and the CSI are transmitted to the base station based on configuration information received from the base station, and wherein the configuration information indicates at least one of at least one resource that is to carry the at least one parameter and the CSI, a type of the at least one parameter, activation of the configuration information, deactivation of the configuration information, or a periodicity associated with CSI reporting by the UE.

10. A method of wireless communication by a base station, the method comprising:
    transmitting at least two reference signals to a user equipment (UE);
    receiving, from the UE, a first channel state information (CSI) associated with at least one of the at least two reference signals;
    receiving, from the UE, an acknowledgement of a request to the UE to select a predictive model from a plurality of predictive models;
    receiving, from the UE, at least one parameter associated with the predictive model and the first CSI;
    determining a predicted CSI with the predictive model based on the first CSI and based on the at least one parameter; and
    transmitting, to the UE, data or control information that is scheduled based on the predicted CSI.

11. The method of claim 10, further comprising:
    evaluating the predictive model based on the first CSI and based on the at least one parameter,
    wherein the determining the predicted CSI is based on the evaluating of the predictive model.

12. The method of claim 11, further comprising:
    communicating, with the UE, information indicating use of the predictive model,
    wherein the at least one parameter is received based on the information indicating the use of the predictive model.

13. The method of claim 12, further comprising:
    receiving an indication of a high-mobility state associated with the UE,
    wherein the communicating of the information indicating the use of the predictive model is based on the indication of the high-mobility state associated with the UE.

14. The method of claim 11, wherein the first CSI associated with the at least one of the at least two reference signals comprises at least two CSI that each corresponds with a respective one of the at least two reference signals, and
    wherein the evaluating of the predictive model is further based on each of the at least two CSI.

15. The method of claim 14, further comprising:
    receiving, from the UE, information indicating a reference time corresponding to one of the at least two CSI,
    wherein the evaluating of the predictive model is further based on the reference time.

16. The method of claim 11, wherein the predictive model comprises at least one of a linear model, a higher-order model, or a neural network model.

17. The method of claim 11, further comprising:
    quantizing at least one value associated with the predicted CSI based on the evaluating of the predictive model; and
    determining a transmission configuration associated with the data or control information based on the quantized at least one value.

18. The method of claim 10, wherein the first CSI comprises at least one of a rank indicator (RI) associated with a first reference signal of the at least two reference signals, a precoding matrix indicator (PMI) associated with the first reference signal, a channel quality indicator (CQI) associated with the first reference signal, a channel coefficient associated with one or more tones, or a reference signal received power (RSRP) associated with the first reference signal.

19. The method of claim 10, further comprising:
transmitting, to the UE, configuration information indicating at least one of at least one resource that is to carry the at least one parameter and the first CSI, a type of the at least one parameter, activation of the configuration information, deactivation of the configuration information, or a periodicity associated with CSI reporting by the UE,
wherein the receiving the at least one parameter and the first CSI from the UE is based on the configuration information.

20. An apparatus for wireless communication by a user equipment (UE), the apparatus comprising:
a memory; and
at least one processor coupled to the memory and configured to:
receive, from a base station, at least two reference signals;
determine channel state information (CSI) associated with at least one of the at least two reference signals;
transmit, to the base station, an acknowledgement of a received request to select a predictive model from a plurality of predictive models;
determine at least one parameter associated with the predictive model based on the CSI;
transmit, to the base station, the at least one parameter and the CSI to enable a predicted CSI to be determined based on the at least one parameter and the CSI; and
receive, from the base station, data or control information that is scheduled based on the predicted CSI.

21. The apparatus of claim 20, wherein the at least one processor is further configured to:
communicate, with the base station, information indicating use of the predictive model associated with the predicted CSI,
wherein the at least one parameter is determined based on the information indicating the use of the predictive model associated with the predicted CSI.

22. The apparatus of claim 21, wherein the at least one processor is further configured to:
detect a high-mobility state, wherein the high-mobility state is associated with a speed of the UE; and
transmit an indication of the high-mobility state to the base station,
wherein the communication, with the base station, of the information indicating the use of the predictive model associated with the predicted CSI is based on the high-mobility state.

23. The apparatus of claim 20, wherein the CSI associated with the at least one of the at least two reference signals comprises at least two CSI that each corresponds with a respective one of the at least two reference signals.

24. The apparatus of claim 23, wherein the at least one processor is further configured to:

transmit, to the base station, information indicating a reference time associated with the predictive model associated with the predicted CSI,
wherein the reference time corresponds to one of the at least two CSI.

25. The apparatus of claim 20, wherein the CSI comprises at least one of a rank indicator (RI) associated with a first reference signal of the at least two reference signals, a precoding matrix indicator (PMI) associated with the first reference signal, a channel quality indicator (CQI) associated with the first reference signal, a channel coefficient associated with one or more tones, or a reference signal received power (RSRP) associated with the first reference signal.

26. An apparatus for wireless communication by a base station, the apparatus comprising:
a memory; and
at least one processor coupled to the memory and configured to:
transmit at least two reference signals to a user equipment (UE);
receive, from the UE, first channel state information (CSI) associated with at least one of the at least two reference signals;
receive, from the UE, an acknowledgement of a request to the UE to select a predictive model from a plurality of predictive models;
receive, from the UE, at least one parameter associated with the first CSI;
determine predicted CSI with the predictive model based on the first CSI and based on the at least one parameter; and
transmit, to the UE, data or control information that is scheduled based on the predicted CSI.

27. The apparatus of claim 26, wherein the at least one processor is further configured to:
evaluate the predictive model based on the first CSI and based on the at least one parameter,
wherein the determination of the predicted CSI is based on the evaluation of the predictive model.

28. The apparatus of claim 27, wherein the at least one processor is further configured to:
communicate, with the UE, information indicating use of the predictive model,
wherein the at least one parameter is received based on the information indicating the use of the predictive model.

29. The apparatus of claim 28, wherein the at least one processor is further configured to:
receive an indication of a high-mobility state associated with the UE,
wherein the communication of the information indicating the use of the predictive model is based on the indication of the high-mobility state associated with the UE.

30. The apparatus of claim 27, wherein the at least one processor is further configured to:
quantize at least one value associated with the predicted CSI based on the evaluating of the predictive model; and
determine a transmission configuration associated with the data or control information based on the quantized at least one value.

* * * * *